No. 736,436. PATENTED AUG. 18, 1903.
C. H. PELTON.
GEARING FOR GRAIN DRILLS.
APPLICATION FILED APR. 12, 1902.
NO MODEL.
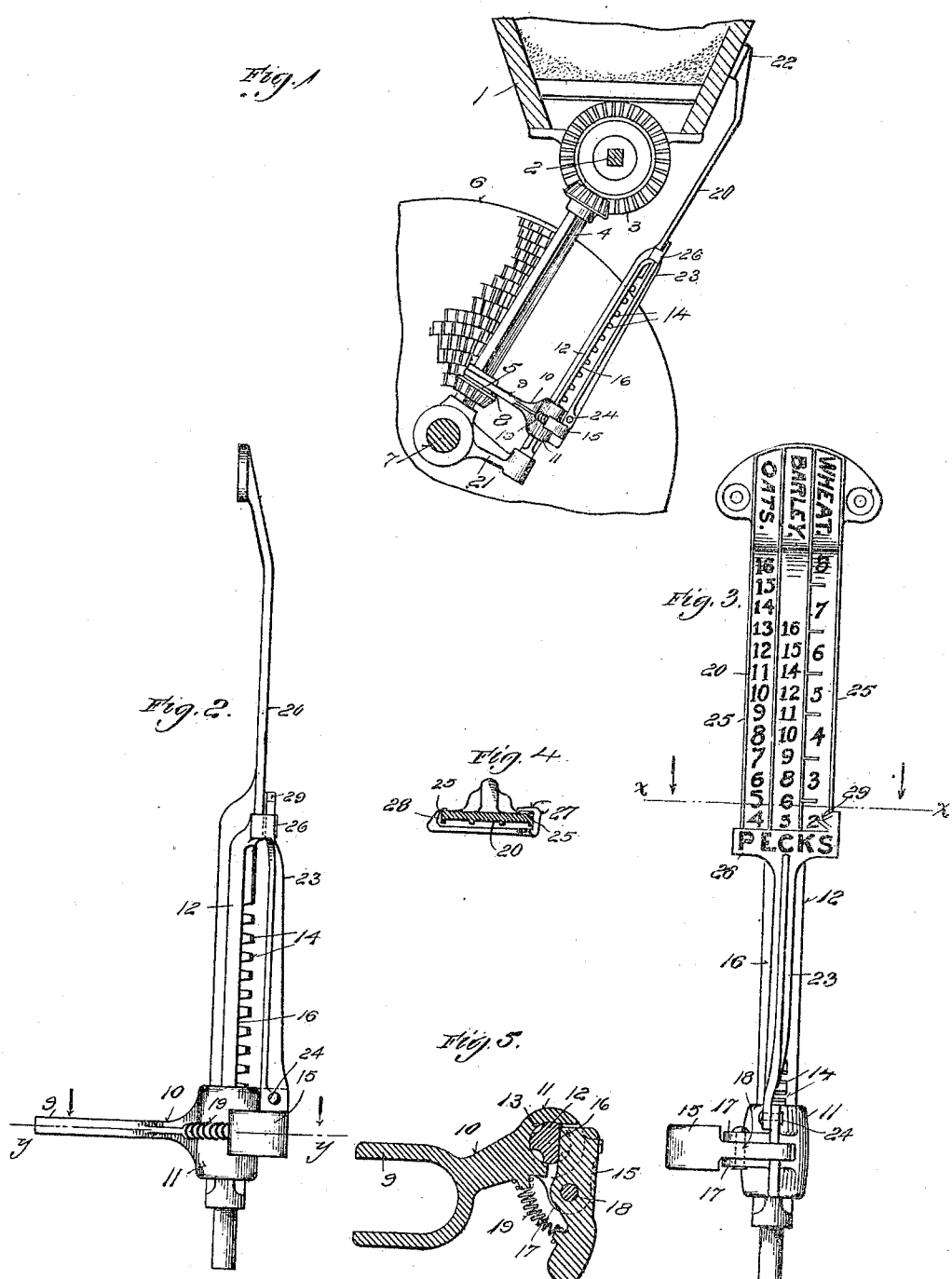
WITNESSES:
INVENTOR
Charles H. Pelton
BY
ATTORNEY.

No. 736,436.

Patented August 18, 1903.

UNITED STATES PATENT OFFICE.

CHARLES H. PELTON, OF SPRINGFIELD, OHIO, ASSIGNOR TO THE THOMAS MANUFACTURING COMPANY, OF SPRINGFIELD, OHIO, A CORPORATION OF OHIO.

GEARING FOR GRAIN-DRILLS.

SPECIFICATION forming part of Letters Patent No. 736,436, dated August 18, 1903.

Application filed April 12, 1902. Serial No. 102,536. (No model.)

*To all whom it may concern:*

Be it known that I, CHARLES H. PELTON, a citizen of the United States, residing at Springfield, in the county of Clark and State of Ohio, have invented certain new and useful Improvements in Gearing for Grain-Drills, of which the following is a specification, reference being had therein to the accompanying drawings.

This invention relates to gearing for grain-drills, and more particularly to the shifting mechanism and indicator whereby the shifting pinion of the change-speed gear is operated and its position indicated.

The present invention has for its object to provide a simple and efficient construction of these parts; and to these ends it consists in certain novel features which I will now proceed to describe and will then particularly point out in the claims.

In the accompanying drawings, Figure 1 is a detail sectional view of a portion of a grain-drill having my improvements applied thereto. Fig. 2 is an enlarged detail view, in side elevation, of the device. Fig. 3 is a front elevation of the device. Fig. 4 is a detail sectional plan taken on the line *x x* of Fig. 3, and Fig. 5 is a detail sectional plan taken on the line *y y* of Fig. 2.

In said drawings, 1 indicates the hopper, and 2 the distributer-shaft by which the distributers are driven, the same deriving its motion through bevel-gearing 3 from a shaft 4, having splined thereon a sliding pinion 5, which meshes with a change-speed disk 6, driven by the axle 7. These parts may be of any approved construction. The pinion 5 is shifted on the shaft 4 to regulate the speed of the distributers, and to this end it is provided with a grooved hub 8. This grooved hub is embraced by a yoke 9, connected by an arm 10 with a sleeve 11, which slides upon a guide-rod 12. The sleeve 11 has an aperture 13, circular in cross-section, so as to permit it to rock to a certain extent upon the guide-rod 12 to cause it to adjust itself to the minor variations of the shaft 4 and pinion 5. In order to lock the parts in position after adjustment, the guide-rod 12 is provided with a rack 14, which coöperates with a pawl 15, mounted on the sleeve 11. In order to prevent clogging of the rack, the rod 12, which is of general circular outline, has its rear face flattened, as indicated at 16, the teeth of the rack 14 projecting from this flattened surface to an extent sufficient to complete the circular outline of the rod at that part and form a suitable bearing-support or guide for the sleeve 11. The pawl 15 is pivoted between lugs 17 of the sleeve 11, as indicated at 18, and there is interposed between said pawl and the sleeve or its arm 10 a spring 19, which tends to engage the pawl with the rack and hold it in such engagement. By reason of this construction the rack is readily cleaned and kept clean, and the pawl is self-locking in its action, so as to hold the parts automatically in their adjusted position.

The upper end of the rod 12 has formed on or secured to it the indicator-plate 20, which is divided into scales in the usual manner. In the present instance I have shown the rod and plate as supported in position by securing the lower end of the rod to the bearing 21, while the upper end of the plate is secured to the hopper, as indicated at 22. The indicator-arm is shown at 23 and is pivotally connected at 24 to the sleeve 11 by means of a pivot parallel with the face of the indicator-plate 21. Said indicator-plate has parallel guiding edges 25, and the indicator-arm 23 is provided with a terminal head 26, having formed on one side thereof a hook-shaped projection 27, which passes around the edge of the indicator-plate and extends a short distance over the back of the same, so as to hold the indicator-head in position against the plate. A short lug 28 bears against the opposite edge of the indicator-plate, and the head is provided with a projecting pointer 29, which serves to accurately indicate the figures on the scales of the indicator-plate. The indicator-arm is thus held firmly in position against the plate, but may be disengaged therefrom by lowering the sleeve 11 until the head 26 is clear of the lower end of the indicator-plate, when the arm and head may be swung outward on the pivot 24, and thus be disengaged.

I do not wish to be understood as limiting myself to the precise details of construction hereinbefore described, and shown in the accompanying drawings, as they may obviously be modified without departing from the principle of my invention.

As hereinbefore stated, the sleeve 11 is permitted to rock slightly upon the guide-rod 12, and to this end said guide-rod is made substantially circular in cross-section, in the sense that although portions of it are removed to form the teeth of the rack 14, and other portions are removed by grooving the rod longitudinally for the sake of lightness and to prevent clogging, the general outline of the rod in cross-section is circular, there being no projecting parts beyond this outline to prevent rotation of the sleeve thereon, and it is in this sense that I employ the term "substantially circular in cross-section" in the claims.

Having thus fully described my invention, what I claim as new, and desire to secure by Letters Patent, is—

1. In a gearing for grain-drills, the combination, with the sliding pinion of a change-speed gear, of a fixed guide-rod provided with a rack, a sleeve slidably mounted on said rod and having a yoke to engage the pinion, and a pawl pivoted on said sleeve and provided with a spring to cause its inner end to normally engage the rack, its outer end extending laterally with respect to the sleeve, whereby, when said outer end is pushed inward or forward, the inner end of the pawl is disengaged from the rack, substantially as described.

2. In a gearing for grain-drills, the combination, with the sliding pinion of a change-speed gear, of a guiding-rod substantially circular in cross-section and having a flattened face provided with a rack thereon conforming substantially to the section of the rod, a sleeve slidably mounted on said rod and having an aperture circular in cross-section and provided with a yoke to engage the pinion, a pawl pivotally mounted on said sleeve, and a spring actuating said pawl to cause it to normally engage the rack, substantially as described.

In testimony whereof I affix my signature in presence of two witnesses.

CHARLES H. PELTON.

Witnesses:
AL. H. KUNKLE,
WILL O'LAUGHLIN.